(12) United States Patent
Jung et al.

(10) Patent No.: US 8,497,956 B2
(45) Date of Patent: Jul. 30, 2013

(54) FLAT PANEL DISPLAY INCLUDING A GLASS WINDOW

(75) Inventors: Ji-Woon Jung, Yongin (KR); Dong-Ho Lee, Yongin (KR); Seon-Chool Kim, Yongin (KR); Jong-Kap Jo, Yongin (KR); Sang-Kyu Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 131 days.

(21) Appl. No.: 13/078,797

(22) Filed: Apr. 1, 2011

(65) Prior Publication Data
US 2011/0242655 A1  Oct. 6, 2011

(30) Foreign Application Priority Data

Apr. 1, 2010 (KR) .................. 10-2010-0029996

(51) Int. Cl.
*G02F 1/1335* (2006.01)
(52) U.S. Cl.
USPC ............................................. 349/96; 349/12
(58) Field of Classification Search
USPC ........................................................ 349/96
See application file for complete search history.

(56) References Cited

U.S. PATENT DOCUMENTS

2004/0051827 A1*  3/2004  Hinata et al. ................. 349/113

FOREIGN PATENT DOCUMENTS

| KR | 10-2000-0011455 A | 2/2000 |
| KR | 10-2004-0072862 A | 8/2004 |
| KR | 10-2004-0100031 A | 12/2004 |
| KR | 10-0615262 B1 | 8/2006 |
| KR | 10-0623224 B1 | 9/2006 |
| KR | 10-0696282 B1 | 3/2007 |
| KR | 10-2008-0085445 A | 9/2008 |
| KR | 10-2009-0101628 A | 9/2009 |

* cited by examiner

*Primary Examiner* — Phu Vu
(74) *Attorney, Agent, or Firm* — Knobbe, Martens, Olson & Bear LLP

(57) ABSTRACT

A flat panel display apparatus is disclosed. In one embodiment, the apparatus includes a panel configured to display an image; a glass window covering the panel; and a polarizing film attached on a surface of the glass window, wherein the polarizing film is configured to prevent the scatter of broken pieces when the glass window breaks and also prevent reflection of an external light.

18 Claims, 2 Drawing Sheets

FLAT PANEL DISPLAY INCLUDING A GLASS WINDOW

RELATED APPLICATIONS

This application claims the benefit of Korean Patent Application No. 10-2010-0029996, filed on Apr. 1, 2010, in the Korean Intellectual Property Office, the disclosure of which is incorporated herein in its entirety by reference.

BACKGROUND

1. Field

The described technology generally relates to a flat panel display, and more particularly, to a flat panel display including a glass window.

2. Description of the Related Technology

Recently, display devices are being replaced with thin flat panel displays including an organic light emitting display, a liquid crystal display (LCD), or the like.

SUMMARY

One aspect is a flat panel display whereby the scatter of broken pieces is effectively prevented when a glass window breaks, and a separate scatter-prevention film and a process of making and attaching the film are unnecessary.

Another aspect is a flat panel display including a panel on which an image is displayed; a glass window for covering the panel; and a polarizing film attached on the glass window.

The polarizing film may be attached on a surface of the glass window that faces the panel, or may be attached on another surface of the glass window, which does not face the panel.

A touch screen may further be arranged between the panel and the glass window, and the panel may include at least one of an organic light emitting panel and a liquid crystal panel.

The polarizing film may simultaneously function to be used in scatter-prevention of the glass window, and to inhibit an external light from being reflected.

Another aspect is a flat panel display comprising: a panel configured to display an image; a glass window covering the panel; and a polarizing film attached on a surface of the glass window, wherein the polarizing film is configured to prevent the scatter of broken pieces when the glass window breaks and also prevent reflection of an external light.

In the above display, the surface of the glass window faces the panel. The above display further comprises a touch screen formed between the panel and the polarizing film. In the above display, the touch screen comprises: first and second substrates facing each other; first and second electrode patterns formed on the first and second substrates, respectively, wherein the first and second electrode patterns face each other; and an insulating material interposed between the substrates and covering the electrode patterns.

In the above display, the glass window is formed over the polarizing film. The above display further comprises an adhesive formed between the glass window and the polarizing film. In the above display, the surface of the glass window does not face the panel. The above display further comprises a touch screen formed between the panel and the glass window.

In the above display, the touch screen comprises: first and second substrates facing each other; first and second electrode patterns formed on the first and second substrates, respectively, wherein the first and second electrode patterns face each other; and an insulating material interposed between the substrates and covering the electrode patterns. In the above display, the polarizing film is formed over the glass window. The above display further comprises an adhesive formed between the polarizing film and the glass window. In the above display, the panel is an organic light emitting panel or a liquid crystal panel. In the above display, the polarizing film is formed at least partially of a non-glass material.

Another aspect is a flat panel display comprising: a panel configured to display an image; a glass window configured to cover the panel, wherein the glass window has first and second surfaces opposing each other, wherein the first surface is closer to the panel than the second surface; and a polarizing film formed between the first surface of the glass window and the panel, wherein the polarizing film is closer to the panel than the glass window, and wherein the polarizing film is formed at least partially of a non-glass material which is configured to prevent the scatter of broken pieces when the glass window breaks.

The above display further comprises a first adhesive formed between the glass window and the polarizing film. The above display further comprises a touch screen which is formed between the panel and the polarizing film. The above display further comprises: a second adhesive formed between the polarizing film and touch screen; and a third adhesive formed between the touch screen and panel.

Another aspect is a flat panel display comprising: a panel configured to display an image; a glass window configured to cover the panel; a touch screen formed between the panel and the glass window; and a polarizing film having first and second surfaces opposing each other, wherein the first surface is closer to the panel than the second surface, and wherein the glass window is formed between the first surface of the polarizing film and the touch screen.

In the above display, the polarizing film is formed at least partially of a non-glass material which is configured to prevent the scatter of broken pieces when the glass window breaks and prevent reflection of an external light. In the above display, the touch screen comprises: first and second substrates facing each other; first and second electrode patterns formed on the first and second substrates, respectively, wherein the first and second electrode patterns face each other; and an insulating material interposed between the substrates and covering the electrode patterns.

DETAILED DESCRIPTION

Figure 1:
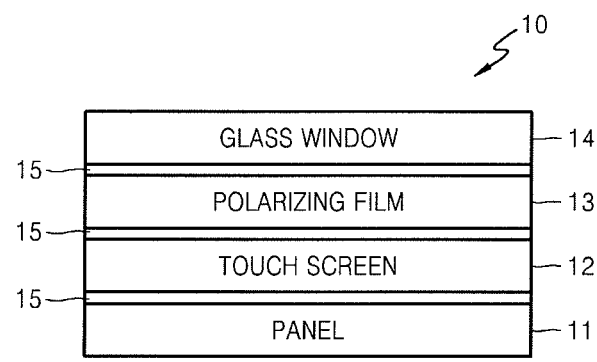
FIG. 1 is a diagram of a structure of a flat panel display according to an embodiment.

In general, a flat panel display has a structure in which a protective glass window is mounted on a panel on which an image is displayed. If the glass window breaks due to excessive impact, broken pieces therefrom are scattered and thus possibly injure the user.

In order to prevent this accident, a separate scatter-prevention film is prepared and attached on the glass window. However, this increases the total number of display components as well as the total number of processes and manufacturing costs. This additional element also increases the thickness of a display product by about 100 μm-about 125 μm.

Reference will now be made in detail to embodiments, examples of which are illustrated in the accompanying drawings, wherein like reference numerals refer to the like elements throughout. The disclosed embodiments may have different forms and should not be construed as being limited to the descriptions set forth herein.

Figure 2:
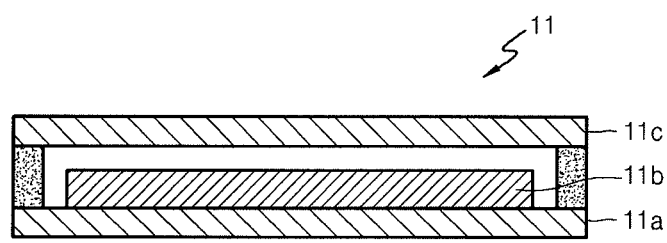
FIG. 2 is a diagram of a structure of a panel in the flat panel display of FIG. 1.
Figure 3:
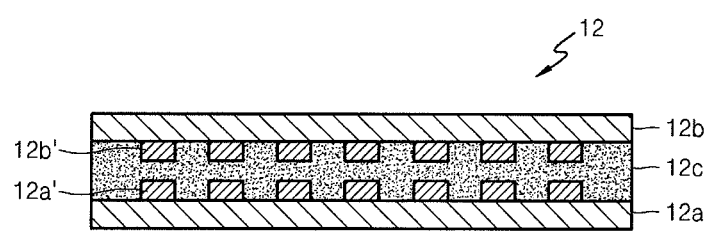
FIG. 3 is a diagram of a structure of a touch screen in the flat panel display of FIG.

FIG. 1 is a diagram of a structure of a flat panel display 10 according to an embodiment. FIGS. 2 and 3 are diagrams of structures of a panel 11 and a touch screen 12 in the flat panel display 10 of FIG. 1.

In one embodiment, as shown in FIG. 1, the flat panel display 10 includes a glass window 14 that covers the panel 11 on which an image is displayed. The glass window 14 may be a protective tempered glass. The touch screen 12 for touch manipulation is arranged between the panel 11 and the glass window 14. A polarizing film 13 is attached on a surface of the glass window 14, which faces the panel 11. An adhesive 15 may be used to couple i) the panel 11 and touch screen 12, ii) the touch screen 12 and polarizing film 13 and iii) the polarizing film 13 and glass window 14. The adhesive 15 may be an optical clear adhesive (OCA).

In one embodiment, as illustrated in FIG. 2, the panel 11 may have a structure in which a display unit 11b is arranged on a substrate 11a, and an encapsulation substrate 11c covers the display unit 11b. The panel 11 may be an organic light emitting panel or a liquid crystal panel.

In one embodiment, as illustrated in FIG. 3, the touch screen 12 may have a structure in which an insulator or insulating material 12c is disposed between two substrates 12a and 12b having electrode patterns 12a' and 12b' formed thereon, respectively. When touch pressure is applied to a top surface of the glass window 14, the insulator 12c is pressed and then the distance between the electrode patterns 12a' and 12b' is changed so that the touch manipulation is performed by detecting a change in capacitance.

The polarizing film 13 may inhibit an external light from being reflected. Further, since the polarizing film 13 is directly attached on an inner surface of the glass window 14 via the adhesive 15, the polarizing film 13 may also prevent the scatter of broken pieces when the glass window 14 breaks.

In one embodiment, the polarizing film 13 may be formed at least partially of i) a non-glass material which is configured to i) prevent the scatter of broken pieces when the glass window 14 breaks and ii) a material which is configured to prevent reflection of an external light. The non-glass material may include at least part of a material used to manufacture a typical scatter-prevention film. In another embodiment, the polarizing film 13 may be formed at least partially of a typical polarizing film material which is configured to prevent the scatter of broken pieces of the glass window 14 in conjunction with the adhesive 15 interposed between the glass window 14 and the polarizing film 13. This description applies to the FIG. 4 embodiment. For example, the broken pieces may stick to the adhesive 15 instead of being scattered.

As discussed above, when the glass window 14 breaks and scatters into pieces, a user may be injured. However, since the polarizing film 13 is attached on the glass window 14, the broken pieces may not be scattered although the glass window 14 breaks. For example, the broken glass pieces are substantially maintained in their original location of the glass without being scattered.

In one embodiment, the polarizing film 13 incorporates the functions of a scatter-prevention film and a typical polarizing film. Since a separate scatter-prevention film is unnecessary, the number of manufacturing processes or the number of components is reduced. If a separate scatter-prevention film is attached, the thickness of the flat panel display 10 is increased about 100 μm-about 125 μm. However, if the polarizing film 13 is used, a display with a thin profile and a product having the display may be realized.

Figure 4:
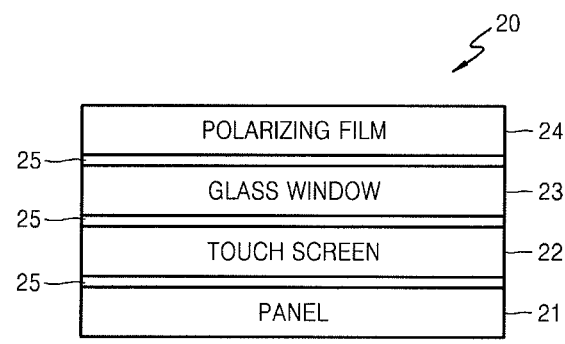
FIG. 4 is a diagram of a structure of a flat panel display according to another embodiment.

FIG. 4 is a diagram of a structure of a flat panel display 20 according to another embodiment.

In one embodiment, as shown in FIG. 4, the flat panel display 20 includes a glass window 23 that may be a protective tempered glass covers a panel 21 on which an image is displayed. A touch screen 22 for touch manipulation is arranged between the panel 21 and the glass window 23, and a polarizing film 24 is attached on an exterior surface of the glass window 23, which does not face the panel 21. A reference numeral 25 indicates an adhesive such as an OCA.

The panel 21 may also include the structure of the panel 11 of FIG. 2, and may be an organic light emitting panel or a liquid crystal panel. The touch screen 22 may also include the structure of the touch screen 12 of FIG. 3.

The polarizing film 24 may simultaneously function to inhibit an external light from being reflected, and to prevent the scatter of broken pieces when the glass window 23 breaks.

The FIG. 1 embodiment has a structure in which the polarizing film 13 is attached on the inner surface of the glass window 14, which faces the panel 11 whereas the FIG. 4 embodiment has a structure in which the polarizing film 24 is attached on the exterior surface of the glass window 14, which does not face the panel 21. Since the functions of the polarizing film 24 are substantially the same as that of the FIG. 1 embodiment, the description thereof will be omitted.

According to at least one embodiment, it is possible to prevent the scatter of the broken pieces when the glass window 23 breaks, without the use of a separate scatter-prevention film. Accordingly, the glass window 23 may have a scatter-prevention function without increasing manufacturing costs, and a slim product may be obtained since an additional element is not included.

Further, the flat panel display according to at least one embodiment is highly profitable and also affords advantageously a slim product, and thus may be used in mobile devices including a mobile phone.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A flat panel display comprising:
a panel configured to display an image;
a glass window covering the panel;
a polarizing film attached on a surface of the glass window, wherein the polarizing film is configured to prevent the scatter of broken pieces when the glass window breaks and also prevent reflection of an external light; and
a touch screen formed between the panel and the polarizing film, wherein the polarizing film and the touch screen contact each other via an adhesive.

2. The display of claim 1, wherein the surface of the glass window faces the panel.

3. The display of claim 1, wherein the touch screen comprises:
first and second substrates facing each other;
first and second electrode patterns formed on the first and second substrates, respectively, wherein the first and second electrode patterns face each other; and an insulating material interposed between the substrates and covering the electrode patterns.

4. The display of claim 1, wherein the glass window is formed over the polarizing film.

5. The display of claim 4, further comprising an adhesive formed between the glass window and the polarizing film.

6. A flat panel display comprising:
a panel configured to display an image;
a glass window covering the panel; and
a polarizing film attached on a surface of the glass window, wherein the polarizing film is configured to prevent the scatter of broken pieces when the glass window breaks and also prevent reflection of an external light, wherein the surface of the glass window does not face the panel.

7. The display of claim 6, further comprising a touch screen formed between the panel and the glass window.

8. The display of claim 7, wherein the touch screen comprises:
first and second substrates facing each other;
first and second electrode patterns formed on the first and second substrates, respectively, wherein the first and second electrode patterns face each other; and
an insulating material interposed between the substrates and covering the electrode patterns.

9. The display of claim 7, wherein the polarizing film is formed over the glass window.

10. The display of claim 9, further comprising an adhesive formed between the polarizing film and the glass window.

11. The display of claim 1, wherein the panel is an organic light emitting panel or a liquid crystal panel.

12. The display of claim 1, wherein the polarizing film is formed at least partially of a non-glass material.

13. A flat panel display comprising:
a panel configured to display an image;
a glass window configured to cover the panel, wherein the glass window has first and second surfaces opposing each other, wherein the first surface is closer to the panel than the second surface;
a polarizing film formed between the first surface of the glass window and the panel, wherein the polarizing film is closer to the panel than the glass window, and wherein the polarizing film is formed at least partially of a non-glass material which is configured to prevent the scatter of broken pieces when the glass window breaks; and
a touch screen formed between the panel and the polarizing film, wherein the polarizing film and the touch screen contact each other via an adhesive.

14. The display of claim 13, wherein the glass window and the polarizing film contact each other via an adhesive.

15. The display of claim 13, wherein the touch screen and the panel contact each other via an adhesive.

16. A flat panel display comprising:
a panel configured to display an image;
a glass window configured to cover the panel;
a touch screen foil led between the panel and the glass window; and
a polarizing film having first and second surfaces opposing each other, wherein the first surface is closer to the panel than the second surface, and wherein the glass window is formed between the first surface of the polarizing film and the touch screen.

17. The display of claim 16, wherein the polarizing film is formed at least partially of a non-glass material which is configured to prevent the scatter of broken pieces when the glass window breaks and prevent reflection of an external light.

18. The display of claim 16, wherein the touch screen comprises:
first and second substrates facing each other;
first and second electrode patterns formed on the first and second substrates, respectively, wherein the first and second electrode patterns face each other; and
an insulating material interposed between the substrates and covering the electrode patterns.

* * * * *